United States Patent [19]

Toyosumi et al.

[11] Patent Number: 5,116,291

[45] Date of Patent: May 26, 1992

[54] MOTOR DRIVEN WHEEL USING HYPOCYCLIC PLANETARY BEARING WITH AXIAL POSITIVE ENGAGEMENT MEANS

[75] Inventors: Shigeru Toyosumi, Obu; Masayuki Tanigawa, Kariya; Masanori Egawa, Chiryu; Kiyoji Minegishi, Aichi, all of Japan

[73] Assignee: Sumitomo Heavy Industries, Ltd., Tokyo, Japan

[21] Appl. No.: 745,650

[22] Filed: Aug. 16, 1991

[30] Foreign Application Priority Data

Oct. 17, 1990 [JP] Japan .................. 2-277620

[51] Int. Cl.⁵ .................. F16H 35/00; F16H 1/32
[52] U.S. Cl. .................. 475/178; 192/67 R; 180/65.6; 74/425
[58] Field of Search .......... 475/162, 178, 179; 403/1; 74/425, 424.8 C; 180/65.6, 11; 192/96, 67 R

[56] References Cited

U.S. PATENT DOCUMENTS

| | | | |
|---|---|---|---|
| 1,620,854 | 3/1927 | Ahlm | 475/178 X |
| 2,405,636 | 8/1946 | Beck | 180/5.6 X |
| 2,846,034 | 8/1958 | Mros | 475/178 X |
| 2,923,365 | 2/1960 | McKechnie | 180/11 |
| 3,504,564 | 4/1970 | Kell | 192/67 R |
| 3,901,337 | 8/1975 | Cragg | 180/65.6 X |
| 4,386,540 | 6/1983 | Skaggs, Jr. | 74/805 |
| 4,426,064 | 1/1984 | Healy | 475/178 X |
| 4,692,049 | 9/1987 | Engle | 403/1 |
| 4,770,062 | 9/1988 | Minegishi | 74/804 |
| 4,813,303 | 3/1989 | Beezer et al. | 74/425 |
| 4,909,100 | 3/1990 | Takagi et al. | 475/175 |

FOREIGN PATENT DOCUMENTS 129454 7/1985 Japan .................. 475/178
62-161026 10/1987 Japan .

Primary Examiner—Richard Lorence
Assistant Examiner—Khoi Q. Ta
Attorney, Agent, or Firm—Armstrong, Nikaido, Marmelstein, Kobovcik & Murray

[57] ABSTRACT

A rotary driving apparatus including internally-meshing planetary reduction gear to which the output rotation of a motor is inputted, a drive shaft to which the output rotation of the planetary reduction gear is transmitted, an output rotary shaft to which the rotation of the drive shaft is transmitted, and a rotary flange provided on the output rotary shaft with a wheel mounted on the flange. The speed of the output rotation of the motor is reduced and then transmitted to the wheel so as to cause a vehicle to run on the wheel. The apparatus further includes a free-wheel mechanism comprising first axially-slidable engagement means provided between the drive shaft and an external gear of the planetary reduction gear, second axially-slidable engagement means provided between the drive shaft and the output rotary shaft, an operational shaft which is arranged to be fixed to an end portion of the drive shaft and which is slidable axially and capable of being fixed at an axial position, a guide in which the operational shaft is guided, and means for permitting the operational shaft to slide axially. When the operational shaft is slid axially, at least the engagement between the drive shaft and the external gear is either established or interrupted.

10 Claims, 7 Drawing Sheets

MOTOR DRIVEN WHEEL USING HYPOCYCLIC PLANETARY BEARING WITH AXIAL POSITIVE ENGAGEMENT MEANS

BACKGROUND OF THE INVENTION

The present invention relates to an apparatus including internally-meshing (or hypocyclic eccentric) planetary reduction gear to serve as a rotary driving apparatus and, more specifically, to such a rotary driving apparatus further including a free-wheel mechanism.

A mechanism for driving the wheels of an industrial vehicle is known, in which the output rotational speed of a hydraulic or electric motor is reduced by an internally-meshing planetary reduction gear, and then transmitted to the axle of the vehicle, whereupon the wheels are rotated.

In such a rotary driving mechanism for an industrial vehicle or the like, the following problem arises when some trouble has occurred in the motor and, accordingly, the vehicle has to be moved to another place for repair work; it is difficult to move the vehicle because of the constrained behavior of the mechanism for rotating the wheels. That is, as the vehicle is being moved, the speed of rotation of the wheels is increased by the internally-meshing planetary reduction gear, and transmitted to the motor. Thus, the torque needed to rotate the wheels is amplified while making the rotation of the wheels difficult.

With a view to overcoming the above problem, a driving mechanism which further includes a free-wheel mechanism has been proposed (for example, in Japanese Utility Model Unexamined Publication No. 62-161026).

The apparatus disclosed in the above-identified publication, that is, a known rotary driving apparatus with an internally-meshing planetary reduction gear that has a free-wheel mechanism, will be described with reference to FIGS. 6 and 7.

The rotation of a hydraulic or electric motor 1 is transmitted to a pinion 3 provided on an end portion of an input shaft 2 so that three driving gears 4 are rotated by the pinion 3. The driving gears 4 rotate eccentric body shafts 5 on which two sets of eccentric bodies 6 are serially provided. As a result, external gears 7, each having a trochoidal or circular-arc tooth shape and each being provided on one of the sets of the eccentric bodies 6, are caused to orbit (i.e., effecting only orbital motion without rotating on its own axis). The external gears 7 mesh with an internal gear 9 having internal teeth consisting of pins 8 so that the internal gear 9 rotates at a reduced speed. Thus, a wheel 10 of the vehicle, which is integrated with the internal gear 9, is caused to rotate.

Suppose some trouble has occurred in the motor 1 and the vehicle has to be moved in order to perform repairs. When the vehicle is being towed for this purpose, the wheel 10 rotates with difficulty because the internally-meshing planetary reduction gear constituting the rotation transmitting mechanism acts as a speed-increasing mechanism. Even if the resistance to the rotation of the motor 1 is small, the resistance is amplified, making it difficult for the motor 1 to be rotated from the side of the wheel 10.

The known mechanism has an arrangement in which the pinion 3 is axially movable. When trouble has occurred in the motor 1, the pinion 3 is axially moved so that it is released from its engagement with the driving gears 4.

However, the known rotary driving device including the free-wheeling mechanism has the following drawback. That is, even when the pinion 3 is axially moved and released from its engagement with the driving gears 4, the rotation of the wheel 10 causes the rotation of the internal gear 9, the external gears 7, the eccentric body shafts 5 and the driving gears 4, thereby involving resistance caused by the rotation of these component parts. Therefore, when this resistance is great, it is still difficult to move the vehicle. In particular, rotation is transmitted from the internal gear 9 to the external gears 7 under great resistance. Thus, it is impossible to move the vehicle using a small towing force.

Another drawback of the known rotary driving apparatus with the free-wheel mechanism is that the state of engagement between the pinion 3 and the driving wheels 4 cannot be checked. As a result, when an operation is to be performed, the operator cannot be positively informed of whether this engagement is established or interrupted. Thus, the operability of known apparatus is not very good.

SUMMARY OF THE INVENTION

Accordingly, an object of the present invention is to provide a rotary driving apparatus with a planetary reduction gear that has a free-wheel mechanism, the apparatus having a simple structure and permitting a vehicle to be moved with a small towing force.

According to the present invention, there is provided a rotary driving apparatus with an internally-meshing planetary reduction gear, comprising: a motor; internally-meshing planetary reduction gear to which the output rotation of the motor is inputted; a drive shaft to which the output rotation of the internally-meshing planetary reduction gear is transmitted; an output rotary shaft to which the rotation of the drive shaft is transmitted; and a rotary flange which is provided on the output rotary shaft and on which a wheel is mounted, wherein the speed of the output rotation of the motor is reduced and then transmitted to the wheel so as to cause a vehicle to run on the wheel, the rotary driving apparatus with the internally-meshing planetary reduction gear further comprising a free-wheel mechanism which comprises: first engagement means provided between the drive shaft and an external gear of the internally-meshing planetary reduction gear, the first engagement means being slidable axially; second engagement means provided between the drive shaft and the output rotary shaft, the second engagement means being slidable axially; an operational shaft arranged to be fixed to an end portion of the drive shaft, the operational shaft being slidable axially and capable of being fixed at an axial position; a guide in which the operational shaft is guided; and means for permitting the operational shaft to slide axially, wherein, when the operational shaft is slid axially, at least the engagement between the drive shaft and the external gear is either established or interrupted.

When some trouble has occurred in the motor, the operational shaft is slid axially so that the drive shaft and the external gear are released from their engagement with each other and maintained in their disengaged state. When the vehicle is towed under this condition, only the output rotary shaft and the drive shaft are rotated by rotation transmitted from the rotary flange. Therefore, the vehicle can be easily moved.

DESCRIPTION OF THE PREFERRED EMBODIMENTS

Figure 1:
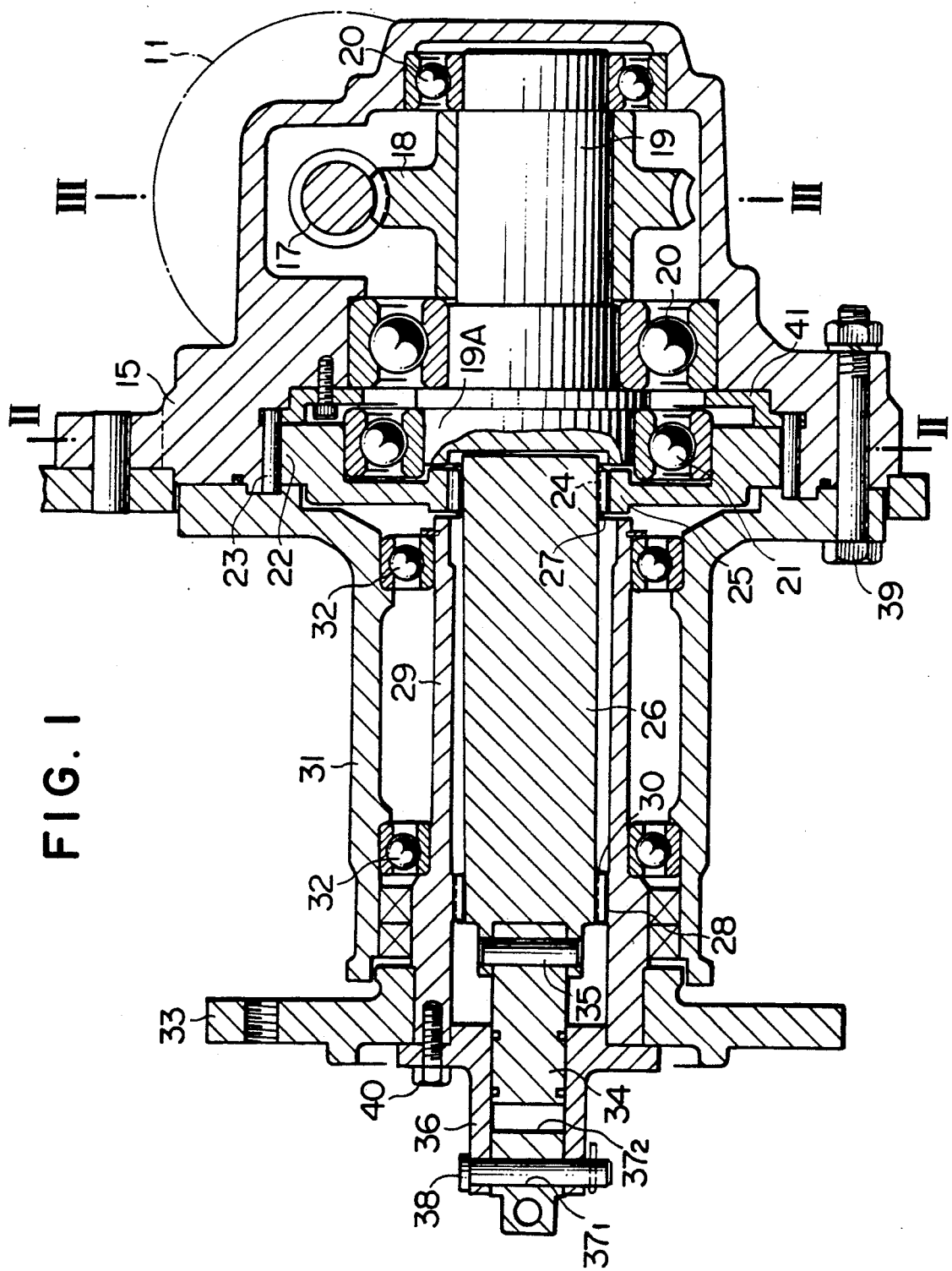
FIG. 1 is a sectional view showing one embodiment of the present invention.
Figure 2:
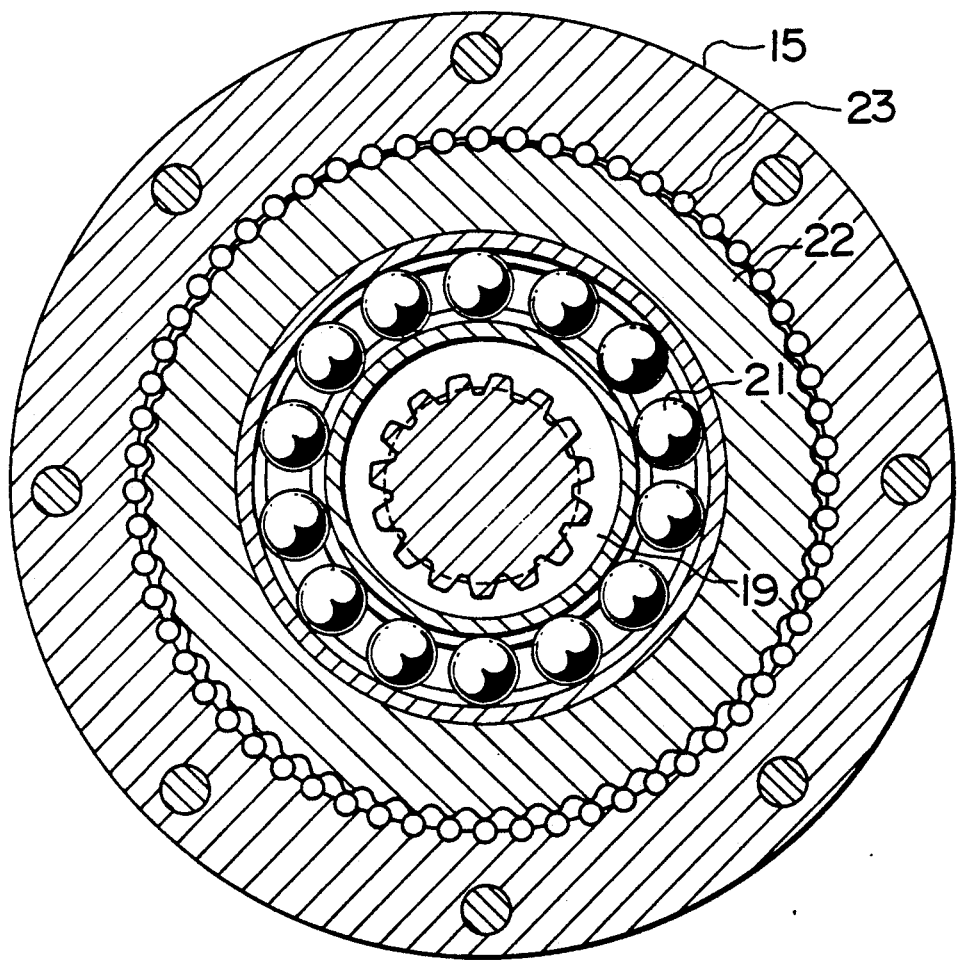
FIG. 2 is a sectional view taken along th line II—II shown FIG. 1.
Figure 3:
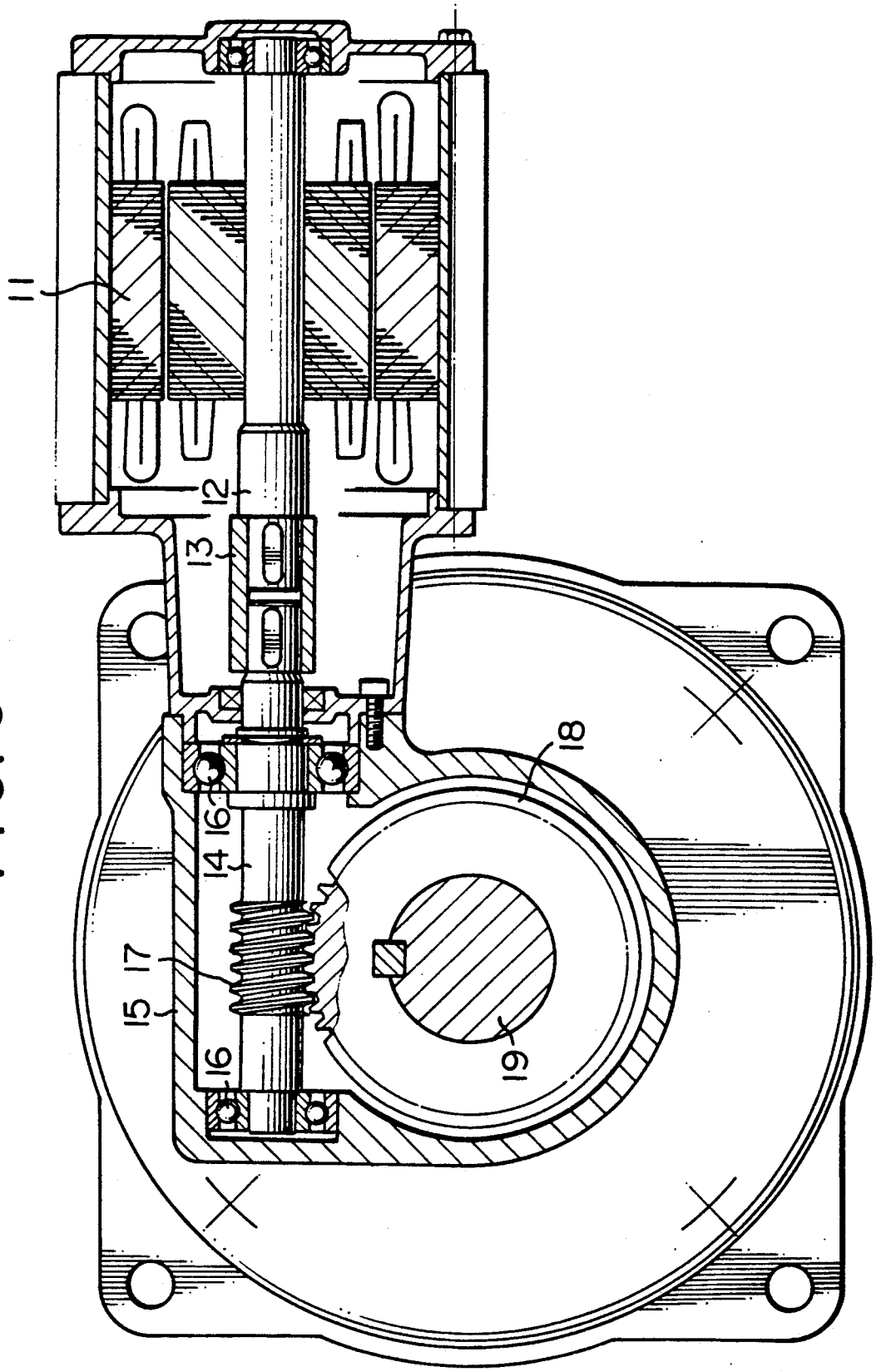
FIG. 3 is a sectional view taken along the line III—III FIG. 1.

An embodiment of the present invention will be described with reference to FIGS. 1 to 3. FIG. 1 is a sectional view of a rotary driving apparatus with a planetary reduction gear that has a free-wheel mechanism, and shows an embodiment of the present invention. FIGS. 2 and 3 are sectional views which are respectively taken along the lines II—II and III—III (both shown in FIG. 1).

An output shaft 12 of a motor 11 is connected to a worm shaft 14 by a coupling 13. The two ends of the worm shaft 14 are supported by a casing 15 with bearings 16 therebetween. A worm 17 is provided on the worm shaft 14. The worm 17 is a member either integral with or separate from the shaft 14, and meshes with a worm wheel 18. The worm wheel 18 is fixed to an intermediate shaft 19. The intermediate shaft 19 is, on either side of the worm wheel 18, supported by the casing 15 with bearings 20 therebetween. Although in this embodiment the intermediate shaft 19 is integral with an eccentric body shaft serving as the input shaft of internally-meshing planetary reduction gear (described later), the intermediate shaft 19 may be separate from the eccentric body shaft.

An eccentric body 19A is provided integrally with an end of the intermediate shaft 19. The eccentric body 19A may be separately provided on the intermediate shaft 19. An eccentric body bearing 21 is provided on the eccentric body 19A, and, on the bearing 21, an external gear 22 having a trochoidal or circular-arc or other tooth shape is provided in such a manner as to be capable of orbiting The eccentric bearing 21 may be omitted. The external gear 22 meshes with an internal gear having external pins 23. Although in this embodiment the internal gear serves as a part of the casing 15, the internal gear may be a structure separate from the casing 15. Further, the internal teeth of the internal gear may have a circular-arc tooth shape The external gear 22 has an engagement flange 25 either integral with or separate from the gear 22, the engagement flange 25 having internal splines 24. The internal splines 24 normally engage with first external splines 27 formed on a portion of a drive shaft 26 at an end thereof. The drive shaft 26 has second external splines 28 formed on a portion at the other end of the drive shaft 26. The second external splines 28 normally engage with internal splines 30 formed on an output rotary shaft 29. In this embodiment, the output rotary shaft 29 is hollow. A supporting member 31, extending in a hollow cylindrical form, is fixed to the casing 15, and the output rotary shaft 29 and the drive shaft 26 are disposed in the inside of the hollow cylindrical supporting member 31. The output rotary shaft 29 is supported by the supporting member 31 with output shaft bearings 32 therebetween. A rotary flange 33 supporting a wheel (not shown) is fixed to a forward end portion (on the left, as viewed in FIG. 1) of the output rotary shaft 29.

An operational shaft 34 has a rearward end portion fitted in a hole on a forward end of the drive shaft 26 and fixed to the drive shaft 26 by a link pin 35. A hollow cylindrical guide 36 is provided at the forward end of the output rotary shaft 29, and a greater part of the operational shaft 34 is slidably disposed in the guide 36. The operational shaft 34 has two position determining holes $37_1$ and $37_2$ which are vertically formed through the shaft 34. A fixing pin 38 is inserted from the outside of the guide 36 into the position determining hole $37_1$, whereby the operational shaft 34 is fixed at its normal position. The distance between the two position determining holes $37_1$ and $37_2$ is sufficient for both establishing and interrupting the engagement between the internal splines 24 and the external splines 27 and the engagement between the internal splines 30 and the external splines 28, as will be described later.

The hollow cylindrical supporting member 31 is fixed to the casing 15 by screws 39. The guide 36 is fixed to the drive shaft 29 by screws 40. In order to prevent disengagement of the external pins 23, an annular, external pin holder 41 is provided. The holder 41 serves to support the external pins 23 from a radially inward position; in addition, the holder 41, whose inner diameter is smaller than the outer diameter of the bearing 20 for the internal shaft 19, serves to prevent disengagement of the bearing 20. Further, the external pin holder 41 has an end face contacting the external gear 22, thereby serving to prevent the external gear 22 from being displaced in the direction of thrust, and thus to hold the gear 22 in position The sectional configuration of the operational shaft 34 and the sectional configuration of the inside of the guide 36 are not limited to circular configurations. Further, the guide 36 may be fixed to the rotary flange 33.

The operation of the embodiment having the above construction will be described below.

In normal condition wherein the wheel (not shown) is rotated, and thus driven, by the motor 11, the apparatus has its various component parts connected to each other in the manner shown in FIG. 1. The rotation of the motor 11 is transmitted through the worm 17 and the worm wheel 18 to the internal shaft 19, and causes the shaft 19 to rotate at a reduced speed. The rotation of the internal shaft 19 is transformed into the orbiting of the external gear 22 of the internally-meshing planetary reduction gear at a reduced speed. The orbiting of the external gear 22 is transmitted through the internal splines 24 and the external splines 27 to the drive shaft 26. The rotation of the drive shaft 26 is transmitted through the external splines 28 and the internal splines 30 to the output rotary shaft 29, whereupon the flange 33 fixed to the output rotary shaft 29 is rotated and the wheel fixed to the rotary flange 33 is rotated, so that the associated vehicle runs on the wheel.

Figure 4:
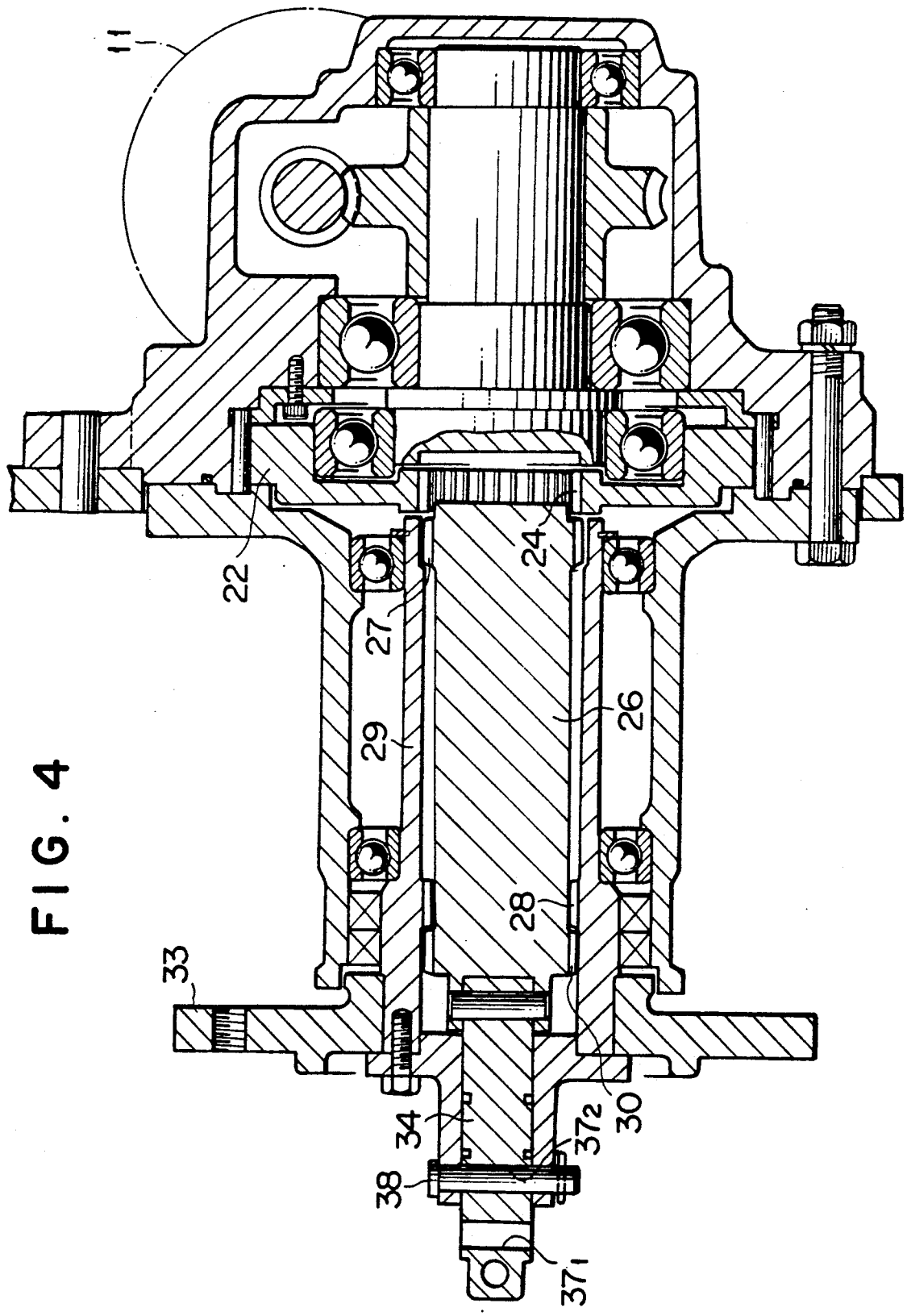
FIG. 4 is a sectional view similar to FIG. 1, showing the state in which a drive shaft is released from its engagement with an external gear and with an output rotary shaft.

Suppose trouble has occurred in the motor, making it impossible for the vehicle to run. The vehicle must be moved, by towing it, to a place where repairs can be performed. In such a case, the fixing pin 38 is drawn out of the position determining hole $37_1$, the operational shaft 34 is moved leftward (as viewed in FIG. 1), and the fixing pin 38 is inserted into the other position determining hole $37_2$ so as to fix the operational shaft 34 at its second position, as shown in FIG. 4. Under this condition, the internal splines 24 of the external gear 22 and the mated external splines 27 of the drive shaft 26 are released from their engagement with each other, while the rotary flange 33, the output rotary shaft 29 and the drive shaft 26 are rotatable, all in one body. Thus, the wheel provided on the flange 33 is rotated during the towing, thereby enabling the vehicle to be easily moved.

Although the above description concerns the case where the movement of the operational shaft 34 interrupts only the engagement between the first external splines 27 of the drive shaft 26 and the internal splines 24 of the external gear 22, it will be apparent that the apparatus may be constructed such that similar movement of the operational shaft interrupts, in addition to the above engagement, the engagement between the second external splines 28 of the drive shaft 26 and the internal splines 30 of the output rotary shaft 29.

Besides the foregoing embodiment, the present invention may be in the form of another embodiment, shown in FIG. 5, which will be described below.

An operational shaft 34 has an externally threaded portion $34_1$, and a head portion $34_2$. The externally threaded portion $34_1$ can be threaded into a guide 36. Other arrangements of the second embodiment are substantially the same as those in the embodiment shown in FIGS. 1 to 3.

Figure 5:
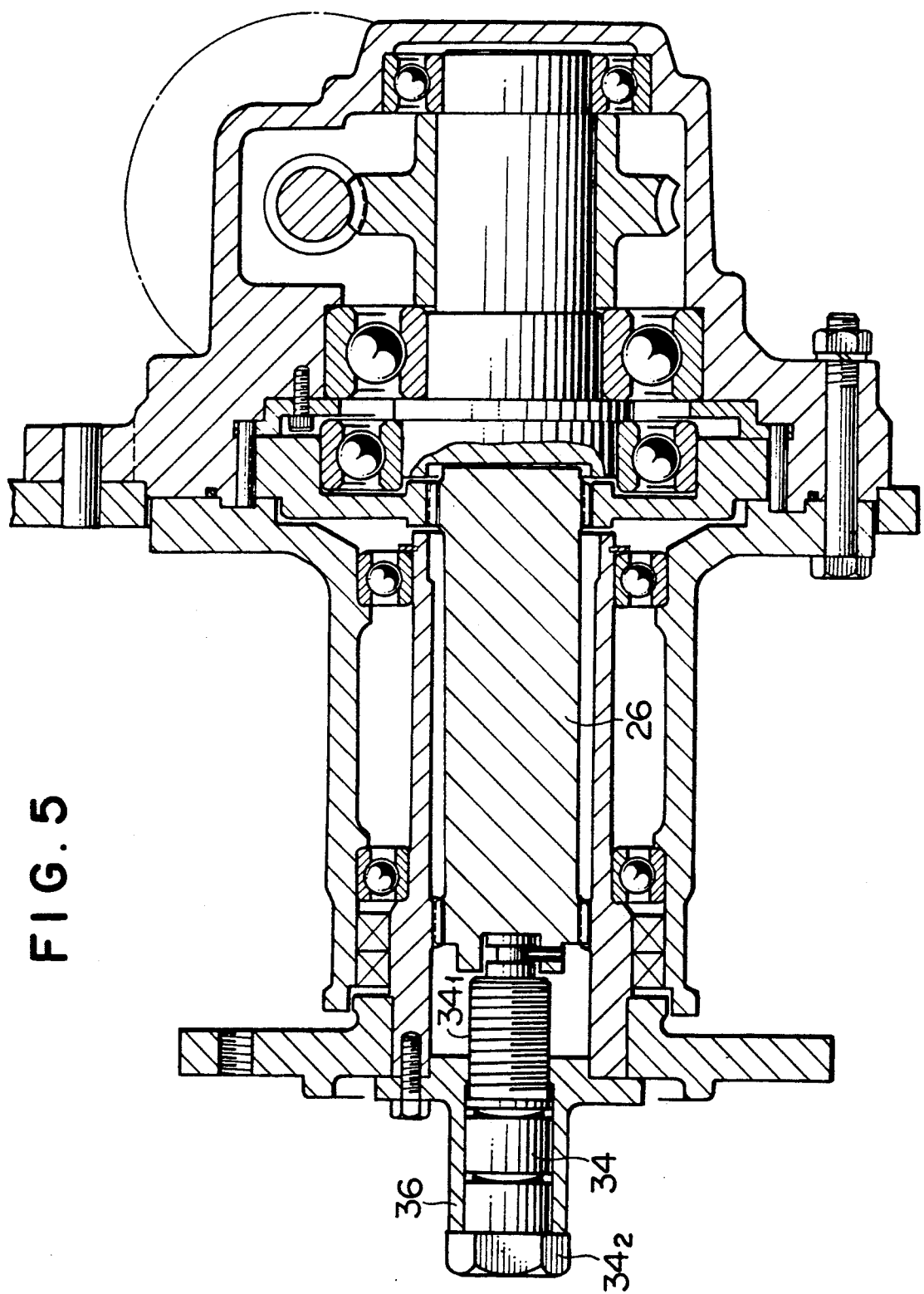
FIG. 5 is a sectional view showing another embodiment of the invention.

In the embodiment shown in FIG. 5, the operational shaft 34 is slid axially by rotating the head portion $34_2$ of the shaft 34, so that the drive shaft 26 is also slid.

The present invention is not limited to the above-described embodiments.

For example, the first-stage speed-reducing mechanism comprising the worm and the worm wheel may be omitted. Further, the speed-reducing mechanism comprising the worm and the worm wheel may be substituted by another speed-reducing mechanism such as a common gear speed-reducing mechanism.

Figure 6:
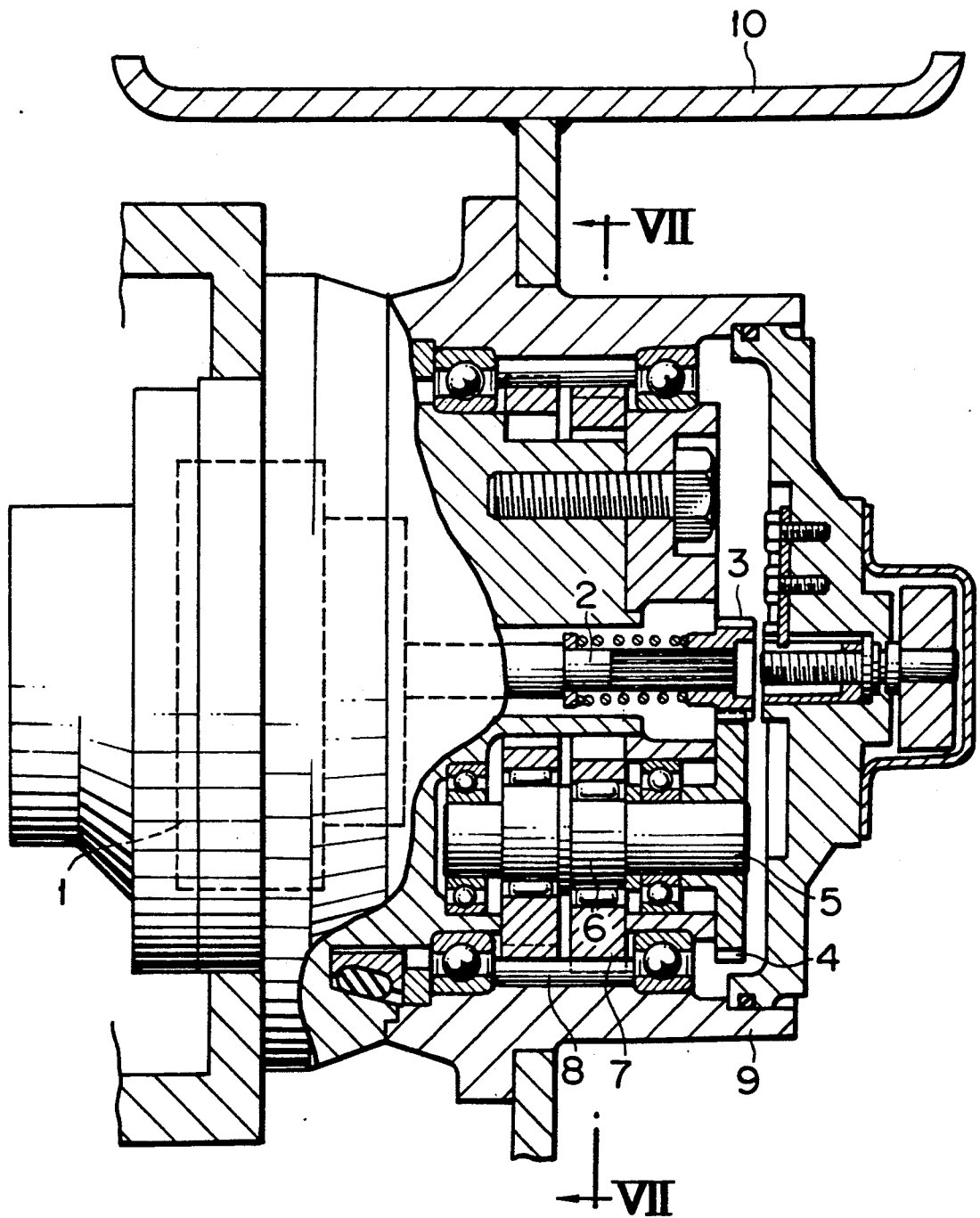
FIG. 6 is a sectional view of a known apparatus with an internally-meshing planetary reduction gear that has a free-mechanism.
Figure 7:
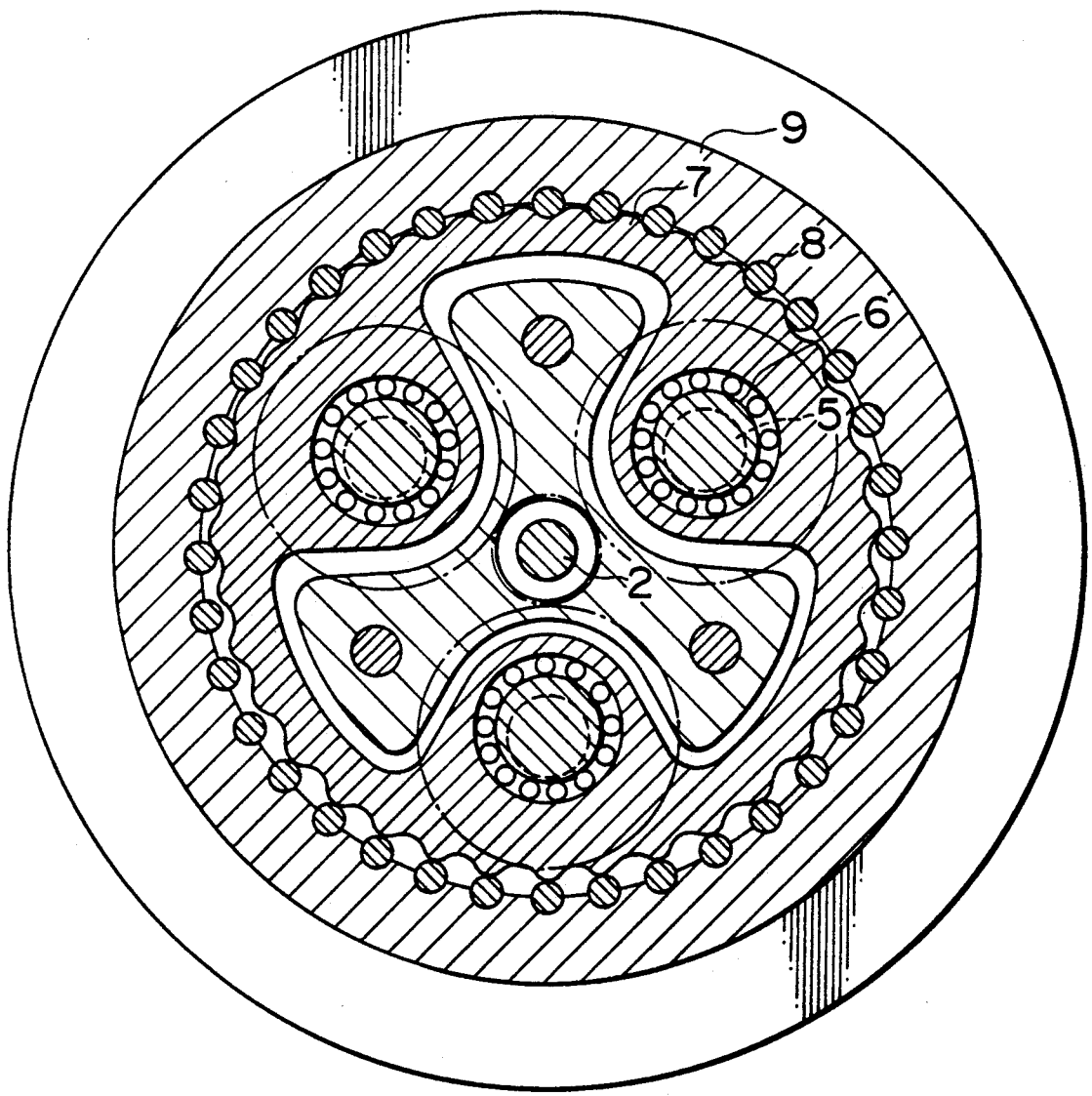
FIG. 7 is a sectional view taken along the line VII—VII shown in FIG. 6.

The present invention also includes in its scope a construction in which the second-stage speed-reducing mechanism consists of the known internally-meshing planetary reduction gear (shown in FIGS. 6 and 7) as well as a construction in which the second-stage speed-reducing mechanism consists of the above-described internally-meshing planetary reduction gear.

Further, the structures for achieving the connection between the drive shaft and the external gear and the connection between the drive shaft and the output rotary shaft are not limited to those of the illustrated embodiments in which the external splines are provided on the drive shaft and the internal splines are provided on the engagement flange of the external gear and the output rotary shaft. Alternatively, internal splines may be provided on the drive shaft, and be brought into engagement with external splines provided on the engagement flange of the external gear. Further, any engagement structure other than that in the foregoing embodiments may be adopted so long as it is capable of sliding axially, and transmitting rotation.

Still further, with respect to the action for establishing or interrupting the engagement between the internal splines and the external splines, the present invention includes, in addition to a construction in which the operational shaft is pulled outward, as in the illustrated embodiments, a construction in which the operational shaft is pushed inward.

The present invention provides the following advantages.

1) In a free-wheel condition, the members that undergo rotation consist only of the output rotary shaft and the drive shaft, and do not include, in contrast with the conventional apparatus, the internally-meshing planetary reduction gear. Therefore, it is possible to tow the vehicle using a small force, thereby facilitating the towing operation.

2) With a construction wherein the operational shaft has position determining holes formed therein, the operation of establishing or interrupting the engagement between the drive shaft and the external gear (or both the engagement between these members and the engagement between the drive shaft and the output rotary shaft) can be performed easily without any errors. Therefore, the operation of towing the vehicle and the operation of recovering its normal running state after the repair work are facilitated also in this respect.

3) With a construction wherein a hollow cylindrical supporting member is provided, and the output shaft is disposed in the supporting member while being supported by two bearings, a long span of the output rotary shaft can be supported. Since this enables the load acting on the wheel to be supported by the two bearings, it is possible to support a great load.

4) With a construction wherein the output shaft is hollow, and the drive shaft is disposed in the output shaft, it is possible to reduce the axial length of the apparatus.

5) With a construction wherein the supporting member is fixed to the casing by screws, the simple operation of removing the screws allows the output rotary mechanism section mainly comprising the drive shaft and the output rotary shaft to be separated from the reduction gear, and removed from the apparatus. This facilitates the replacement of component parts of the section, repair work, etc.

6) With a construction wherein the guide is fixed to the output rotary shaft by screws, the simple operation of removing the screws allows the drive shaft to be removed from the apparatus, thus facilitating the replacement of the drive shaft, repair work, etc.

What is claimed is:

1. A rotary driving apparatus with an hypocyclic eccentric planetary reduction gear, comprising: a motor; hypocyclic eccentric planetary reduction gear to which the output rotation of said motor is inputted; a drive shaft to which the output rotation of said hypocyclic eccentric planetary reduction gear is transmitted; an output rotary shaft to which the rotation of said drive shaft is transmitted; and a rotary flange which is provided on said output rotary shaft and on which a wheel is mounted, wherein the speed of said output rotation of said motor is reduced and then transmitted to said wheel so as to cause a vehicle to run on said wheel, said rotary driving apparatus with said hypocyclic eccentric planetary reduction gear further comprising a free-wheel mechanism which comprises: first engagement means provided between said drive shaft and an external gear of said hypocyclic eccentric planetary reduction gear, said first engagement means being slidable axially; second engagement means provided between said drive shaft and said output rotary shaft, said second engagement means being slidable axially; an operational shaft arranged to be fixed to an end portion of said drive shaft, said operational shaft being slidable axially and capable of being fixed at an axial position; a guide in which said operational shaft is guided; and means for permitting said operational shaft to slide axially, wherein, when said operational shaft is slid axially, at least the engagement between said drive shaft and said external gear is either established or interrupted.

2. A rotary driving apparatus according to claim 1, wherein means for permitting said operational shaft to slide axially and to be fixed at an axial position comprises two position determining holes formed in said operational shaft, said guide in which said operational shaft is guided, and a fixing pin which can be inserted from the outside of said guide into one of said position determining holes, wherein, when said fixing pin is inserted into one of said position determining holes, said drive shaft is brought into engagement with said external gear and with said output rotary shaft, whereas when said fixing pin is inserted into the other position determining hole, said drive shaft is released from its engagement with said external gear and with said output rotary shaft.

3. A rotary driving apparatus according to claim 1, wherein means for permitting said operational shaft to slide axially and to be fixed at an axial position comprises a threaded structure between said operational shaft and said guide.

4. A rotary driving apparatus according to claim 1, further comprising a supporting member having a hollow cylindrical portion and being provided on a casing of said hypocyclic eccentric planetary reduction gear, said output rotary shaft being disposed in said supporting member with two bearings between said output rotary shaft and said supporting member.

5. A rotary driving apparatus according to claim 4, wherein said supporting member is removably fixed to said casing by screws.

6. A rotary driving apparatus according to claim 1, wherein said guide is removably fixed to either said output rotary shaft or said rotary flange by screws.

7. A rotary driving apparatus according to claim 1, wherein said output rotary shaft is hollow, said drive shaft being disposed in the inside of said hollow drive shaft.

8. A rotary driving apparatus according to claim 1, wherein said first axially-slidable engagement means provided between said drive shaft and said external gear of said hypocyclic eccentric planetary reduction gear comprises external splines formed on said drive shaft, and internal splines formed on an engagement flange of said external gear.

9. A rotary driving apparatus according to claim 1, wherein said second axially-slidable engagement means provided between said drive shaft and said output rotary shaft comprises external splines formed on said drive shaft, and internal splines formed on said output rotary shaft.

10. A rotary driving apparatus according to any of claims 1 to 9, further comprising a speed-reducing mechanism provided between said motor and said hypocyclic eccentric planetary reduction gear, said speed-reducing mechanism comprising a worm and a worm wheel.

* * * * *